(12) United States Patent
Adams et al.

(10) Patent No.: US 6,539,315 B1
(45) Date of Patent: Mar. 25, 2003

(54) REGULATOR FLOW MEASUREMENT APPARATUS

(75) Inventors: Paul R. Adams, Marshalltown, IA (US); David E. Woollums, Frisco, TX (US); Jon B. Milliken, Marshalltown, IA (US)

(73) Assignee: Fisher Controls International, Inc., Marshalltown, IA (US)

( * ) Notice: Subject to any disclaimer, the term of this patent is extended or adjusted under 35 U.S.C. 154(b) by 32 days.

(21) Appl. No.: 09/603,474

(22) Filed: Jun. 23, 2000

Related U.S. Application Data (60) Provisional application No. 60/141,576, filed on Jun. 29, 1999.

(51) Int. Cl.[7] .................................................. G01L 1/00
(52) U.S. Cl. .......................... 702/47; 702/45; 702/100; 137/487.5; 73/199; 73/861.47; 73/861.58
(58) Field of Search .......................... 702/45, 47, 100; 137/487.5; 73/199, 861.47, 861.58

(56) References Cited

U.S. PATENT DOCUMENTS

| | | | | |
|---|---|---|---|---|
| 2,536,000 A | * | 12/1950 | Bowditch ..................... | 137/79 |
| 3,633,416 A | * | 1/1972 | Van Dyke et al. ............ | 73/199 |
| 3,846,774 A | | 11/1974 | Thorbard et al. ....... | 340/239 R |
| 4,206,902 A | * | 6/1980 | Barthel et al. ................ | 138/30 |
| 4,581,707 A | | 4/1986 | Millar ........................ | 364/509 |
| 5,047,965 A | | 9/1991 | Zlokovitz ................... | 364/558 |
| 5,197,328 A | | 3/1993 | Fitzgerald ..................... | 73/168 |
| 5,251,148 A | * | 10/1993 | Haines et al. ............ | 137/487.5 |
| 5,636,653 A | | 6/1997 | Titus ............................ | 137/14 |
| 5,728,942 A | | 3/1998 | Boger ........................ | 73/756 |
| 6,035,878 A | | 3/2000 | Adams et al. ................. | 137/1 |
| 6,056,008 A | | 5/2000 | Adams et al. ........... | 137/487.5 |
| 6,178,997 B1 | | 1/2001 | Adams et al. ........... | 137/487.5 |

FOREIGN PATENT DOCUMENTS

| | | | |
|---|---|---|---|
| DE | 40 25 323 | 2/1992 | ............ G01F/1/36 |
| DE | 94 04 829.0 | 6/1994 | ............ F16K/1/00 |
| EP | 0 660 017 A1 | 12/1994 | |
| EP | 0 708 389 A1 | 4/1996 | |

OTHER PUBLICATIONS

PCT International Search Report for PCT/US00/17585.
Tartarini, "Data Logger LOGT 600" Brochure, Sep. 1998.

\* cited by examiner

*Primary Examiner*—John Barlow
*Assistant Examiner*—Stephen J. Cherry
(74) *Attorney, Agent, or Firm*—Marshall, Gerstein & Borun (57) ABSTRACT

Apparatus for determining fluid flow through a pressure regulator is disclosed. The pressure regulator is disposed in a fluid flow passage and has a throttling element moveable in the flow passage. A stem is attached to the throttling element. The apparatus includes a first pressure sensor for measuring pressure upstream of the throttling element, a second pressure sensor for measuring pressure downstream of the throttling element, and a travel sensor for detecting the position of the throttling element. A processor is provided which includes a stored algorithm for determining flow rate based on the measured pressure and travel values.

38 Claims, 8 Drawing Sheets

REGULATOR FLOW MEASUREMENT APPARATUS

CROSS-REFERENCE TO RELATED APPLICATION

This application claims the benefit under 35 U.S.C. §119 (e) of U.S. provisional patent application Serial No. 60/141, 576 filed Jun. 29, 1999, the disclosure of which is incorporated herein by reference.

FIELD OF THE INVENTION

The present invention generally relates to regulators and, more particularly, to apparatus and methods for measuring operational parameters across a regulator and calculating flow.

BACKGROUND OF THE INVENTION

In the control of fluid in industrial processes, such as oil and gas pipeline systems, chemical processes, etc., it is often necessary to reduce and control the pressure of a fluid. Regulators are typically used for these tasks by providing adjustable flow restriction through the regulator. The purpose of the regulator in a given application may be to control flow rate or other process variables, but the restriction inherently induces a pressure reduction as a by-product of its flow control function.

By way of example, a specific application in which regulators are used is the distribution and transmission of natural gas. A natural gas distribution system typically includes a piping network extending from a natural gas field to one or more consumers. In order to transfer large volumes of gas, the gas is compressed to an elevated pressure. As the gas nears the distribution grid and, ultimately, the consumers, the pressure of the gas is reduced at pressure reducing stations. The pressure reducing stations typically use regulators to reduce gas pressure.

It is important for natural gas distribution systems to be capable of providing sufficient volumes of gas to the consumers. The capacity of this system is typically determined by the system pressure, piping size, and the regulators, and system capacity is often evaluated using a simulation model. The accuracy of the system model is determined using flow data at various input points, pressure reducing points, and output points. The pressure reducing points significantly impact the capacity of the gas distribution system, and therefore it is important for the system model to accurately simulate the pressure reducing points. The pressure reducing points, however, are within the distribution system and therefore are not considered custody transfer points (i.e., points at which the control of gas flow switches from the distribution system to the consumer). As a result, flow measurement is typically not provided at the pressure reducing points. Furthermore, since the pressure reducing points are not custody transfer points, the added cost of high accuracy is not required. Flow measurement problems similar to those described above with respect to natural gas distribution are also present in other regulator applications (i.e., industrial processes, chemical processes, etc.).

In addition, regulators are subject to failure due to wear during operation, thereby reducing the ability to control pressure along a pipeline. A damaged regulator may allow fluid to leak, thereby increasing fluid waste and possibly creating a hazardous situation. While damaged regulators may be repaired or replaced, it is often difficult to detect when a regulator has failed and determine which regulator is damaged. Detecting a failure and determining which regulator has failed is more difficult in a typical natural gas delivery system, where pipelines may run several miles. Accordingly, apparatus which detects apparatus failure and identifies the location of the failure is greatly desired.

SUMMARY OF THE INVENTION

In accordance with certain aspects of the present invention, apparatus is provided for determining fluid flow through a pressure regulator disposed in a fluid flow passage, the pressure regulator including a throttling element moveable in the flow passage. The apparatus comprises a first pressure sensor in fluid communication upstream of the throttling element for measuring an upstream pressure $P_1$, a second pressure sensor in fluid communication downstream of the throttling element for measuring a downstream pressure $P_2$, and a travel indicator for determining a throttling element position Y. A processor is associated with the first pressure sensor, second pressure sensor, and travel sensor, the processor having a stored program for determining a flow rate F based on the upstream pressure $P_1$, the downstream pressure $P_2$, and the throttling element position Y.

In accordance with additional aspects of the present invention, a method is provided for determining fluid flow through a pressure regulator disposed in a fluid flow passage, the pressure regulator having a throttling element moveable in the flow passage. The method comprises the steps of generating an upstream pressure value $P_1$ by measuring fluid pressure upstream of the throttling element, generating a downstream pressure value $P_2$ by measuring fluid pressure downstream of the throttling element, and generating a travel value Y by determining a position of the throttling element. A fluid flow value F is calculated based on the upstream pressure value $P_1$, downstream pressure value $P_2$, and travel value Y.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures, and in which:

DETAILED DESCRIPTION OF THE PREFERRED EMBODIMENTS

Figure 1:
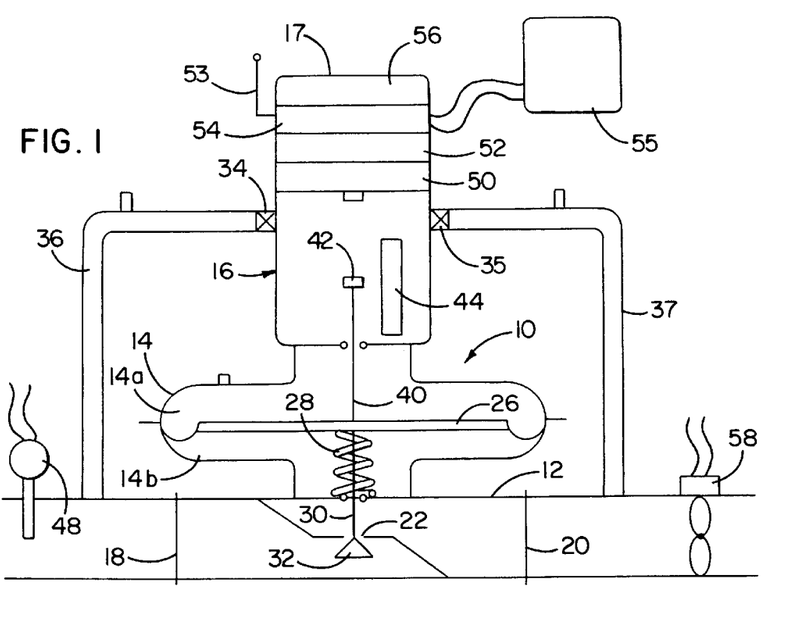
FIG. 1 is a schematic diagram illustrating a regulator with flow measuring apparatus in accordance with the present invention.

FIG. 1 illustrates a preferred embodiment of a fluid pressure regulator, such as a gas pressure regulator 10, in accordance with the invention. The illustrated gas pressure regulator 10 includes gas flow measuring apparatus as will be described hereinafter wherein upstream pressure, downstream pressure, and orifice opening measurements are used to calculate flow and other information. It is to be understood that a liquid pressure regulator also may be provided in accordance with the principles of the invention, as the illustrated gas pressure regulator is merely one example of a fluid pressure regulator according to the invention.

The regulator shown in FIG. 1 includes a regulator body 12, a diaphragm housing 14, and an upper housing 16. Within the regulator body 12, there is provided an inlet 18 for connection to an upstream pipeline and an outlet 20 for connection to a downstream pipeline. An orifice 22 inside the regulator body 12 establishes communication between the inlet 18 and the outlet 20.

A diaphragm 26 is mounted inside the diaphragm housing 14 and divides the housing 14 into upper and lower portions 14a, 14b. A pressure spring 28 is attached to a center of the diaphragm 26 and is disposed in the lower portion of the diaphragm housing 14b to bias the diaphragm 26 in an upward direction.

A stem 30 is attached to and moves with the diaphragm 26. A throttling element, such as a valve disc 32, is attached to a bottom end of the stem 30 and is disposed below the orifice 22. The valve disc 32 is sized to completely block the orifice 22, thereby cutting off communication from the inlet 18 to the outlet 20. Accordingly, it will be appreciated that the pressure spring 28 biases the valve disc 32 in an upward direction to close the orifice 22. The valve disc 32 is formed with a varying cross-section so that, as the valve disc 32 moves downwardly, the unblocked (or open) area of the orifice 22 gradually increases. As a result, the open area of the orifice 22 is directly related to the position of the valve disc 32.

Gas pressure in the upper chamber of the diaphragm 14a is controlled to move the valve disc 32 between the closed and open positions. Pressure in the upper portion of the housing 14a may be provided in a number of different manners. In the present embodiment, pressure in the upper portion 14a is controlled by a loading pilot (not shown). However, the regulator 10 may be of a type which uses a different type of operator, such as an unloading pilot, or the regulator 10 may be self-operated or pressure-loaded, without departing from the scope of the present invention.

A further alternative for controlling the gas pressure in the upper portion of the diaphragm housing 14a includes a first tube running from the upstream piping to the upper portion of the diaphragm housing 14a, with a first solenoid controlling gas flow therethrough. A second tube is also provided which runs from the upper portion of the diaphragm housing 14a to the downstream piping and has a second solenoid disposed therein to control flow therethrough. A personal computer is connected to the first and second solenoids to control their operation. To increase pressure in the upper portion of the diaphragm housing 14a, the first solenoid is opened to allow upstream pressure into the upper portion, thereby driving the diaphragm 26 downward to open the orifice 22. Gas may be exhausted through the second solenoid to thereby reduce pressure in the upstream portion 14a and raise the diaphragm 26, thereby closing the orifice 22. Regardless of the manner of providing and controlling pressure, it will be appreciated that increased pressure moves the diaphragm 26 and attached valve disc 32 downward to open the orifice 22 while decreased pressure closes the orifice 22. This arrangement is given by way of example only, and is not intended to limit the scope of the present invention, as other arrangements well known in the art may also be used.

In accordance with certain aspects of the present invention, pressure sensors are provided upstream and downstream of the throttling element to measure upstream and downstream pressure levels $P_1$, $P_2$. As illustrated in FIG. 1, the first and second pressure sensors 34, 35 are mounted to the upper housing 16. Tubing 36 extends from the first pressure sensor 34 to tap into piping located upstream of the regulator inlet 18. Additional tubing 37 extends from the second pressure sensor 35 to tap into piping located downstream of the regulator outlet 20. Accordingly, while the first and second pressure sensors 34, 35 are mounted on the upper housing 16, the tubing 36, 37 communicates upstream and downstream gas pressure, respectively, to the first and second pressure sensors 34, 35. In the alternative, the first and second pressure sensors 34, 35 may be located directly in the upstream and downstream piping with wiring running from the pressure sensors to the upper housing 16. To provide for temperature correction, if desired, a process fluid temperature transmitter 48 is located in the upstream piping which measures process temperature.

The upper housing 16 further includes a sensor for determining valve disc position. According to the illustrated embodiment, the stem 30 is attached to the valve disc 32 and is connected to the diaphragm 26. A travel indicator 40, which is preferably an extension of the stem 30, extends from the diaphragm and into the upper housing 16, so that the position of the travel indicator 40 corresponds to the position of the valve disc 32. The sensor, therefore, comprises an indicator travel sensing mechanism, preferably a Hall effect sensor. The Hall effect sensor includes a Hall effect magnet 42 attached to an upper end of the travel indicator 40. A magnet sensor 44 is disposed inside the upper housing 16 for sensing the location of the Hall effect magnet 42. By detecting the position of the magnet 42, the location of the valve disc 32 and hence the open area of the orifice 22 may be determined. A second travel indicator (not shown) may be linked to the travel indicator 40 to provide visual indication of valve disc travel. The second travel indicator runs upwardly from the travel indicator 40 and through the upper housing 16 to extend above a top surface of the upper housing 16.

An alternative for measuring travel of the valve disc 32 is the use of a radar transceiver (not shown) disposed above the travel indicator 40 in the upper housing 16. The radar transceiver detects the position of the travel indicator 40 and transmits a signal indicating travel indicator position.

It will be appreciated that the position of the valve disc 32 may be determined in a number of different manners in addition to the magnet 42 and sensor 44 embodiment described above. For example, a laser sensor (not shown) may be provided either in the upper housing 16 to measure the position of the travel indicator 40, or in the diaphragm housing 14 for directly measuring the position of a portion of the diaphragm 26. When the laser sensor is in the latter position, the travel indicator 40 is not needed. In addition, an ultrasonic sensor may be used to determine valve disc position.

Figure 2:
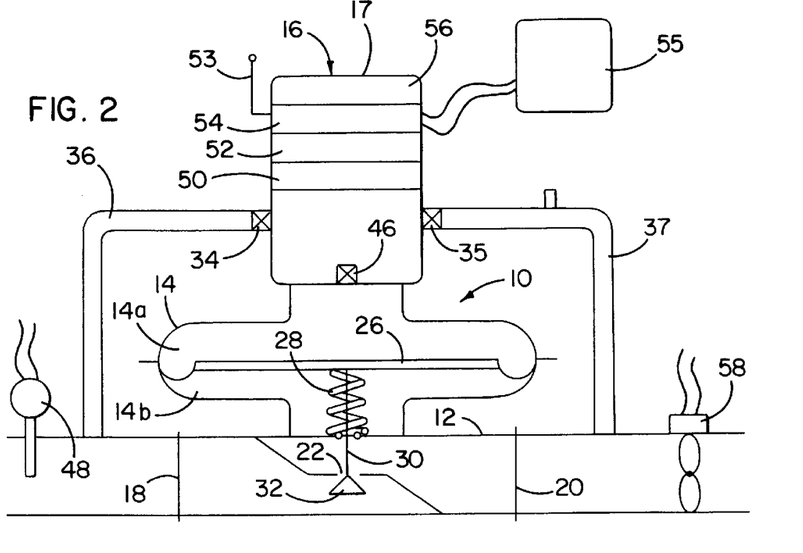
FIG. 2 is a schematic diagram of an additional embodiment of a regulator incorporating flow measuring apparatus.

A further alternative, illustrated at FIG. 2, measures loading pressure in the upper portion of the diaphragm housing 14a to infer valve disc position. It will be appreciated that the position of the valve disc 32 varies with the pressure present in the upper portion 14a of the diaphragm housing. In this embodiment, a loading pressure sensor 46 is provided in the upper housing 16 for measuring pressure at the upper portion of the diaphragm housing 14a. The measured loading pressure may then be used to determine valve disc position.

Returning to the embodiment of FIG. 1, the first and second pressure sensors 34, 35 and the travel sensor 44 provide output which is fed into an electronic flow module 50. The electronic flow module 50 may be provided integrally with the regulator, such as in the upper housing 16 as illustrated in FIG. 1, or may be remotely positioned. The inlet pressure, outlet pressure, and valve disc position are used to determine flow through the variable orifice of the regulator 10. For sub-critical gas flow, the flow rate is calculated using the algorithm:

$$F = \sqrt{\frac{K_1}{G*T}} * K_2 * Y * P_1 * \sin K_3 \sqrt{\frac{P_1 - P_2}{P_1}}, \text{ where}$$

F=flow rate,
$K_1$=absolute temperature constant,
G=specific gravity of the flow media,
T=absolute temperature of the flow media,
$K_2$=stem position constant,
Y=stem position,
$P_1$=absolute upstream pressure,
$K_3$=trim shape constant, and
$P_2$=absolute downstream pressure.

The stem position and trim shape constants $K_2$, $K_3$ are specific to the particular size and type of regulator, and are primarily dependent on the specific trim size and shape. As those skilled in the art will appreciate, the product of $K_2$ and Y may be equivalent to a traditional flow sizing coefficient. The above algorithm is suitable for calculating sub-critical (i.e., $P_1-P_2<0.5P_1$) gas flow rate through linear, metal trim valve type regulators.

For critical gas flows, the calculation is modified by eliminating the sine function. For other types of regulators, such as non-linear metal trim and elastomeric style regulators, a similar algorithm is used, however the stem position constant $K_2$ becomes a function related to pressure drop $\Delta P$ (i.e., the difference in upstream and downstream pressures $P_1$, $P_2$) and/or valve stem position, as well known in the art. For liquid flow, the equation becomes:

$$F = \sqrt{\frac{K_1}{G*T}} * K_2 * Y * \sqrt{P_1 - P_2}, \text{ where}$$

F=flow rate,
$K_1$=absolute temperature constant,
G=specific gravity of the flow media,
T=absolute temperature of the flow media,
$K_2$=stem position constant,
Y=stem position,
$P_1$=absolute upstream pressure, and
$P_2$=absolute downstream pressure.

A similar calculation is used in the embodiment of FIG. 2, which measures loading pressure in the upper portion of the diaphragm housing 14a to infer valve disc travel, except a loading pressure constant $K_4$ and a gauge loading pressure $P_L$ replace the stem position constant $K_2$ and the stem position Y values. The loading pressure constant $K_4$ is also application specific and must be determined for each type of regulator 10. For non-linear elastomeric throttling members, the loading pressure constant $K_4$ is a function of $\Delta P$ and $P_L$.

In the preferred embodiment, a local flow view module 52 is also disposed inside the upper housing 16. The local flow view module 52 includes an electronic flow totalizer which provides totalized flow information. The local flow view module 52 further has an output port which allows access by a hand-held communication device to access the totalized flow and reset the local flow totalizer for future use. In the currently preferred embodiment, the local flow view module 52 includes an LCD readout enclosed inside the upper housing 16. A cap 17 attached to the top of the upper housing 16 has a clear plastic window which allows the LCD readout to be viewed.

A communication module 54 transmits flow data to an auxiliary communication device 55, such as a remote terminal unit (RTU), a PC, or any other device capable of interrogating the regulator controls. The communication module 54 may include an antenna 53 for transmitting flow information to a remote meter reading system (not shown). A power module 56 is also provided for powering the flow measurement mechanism. The power module 56 is capable of providing regulated voltage for the entire device, and may be supplied by any well known source such as solar, battery, and DC or AC power sources.

It will be appreciated that the electronic flow module 50, local flow view module 52, communication module 54, and power module 56 may be separately provided as illustrated in FIG. 1, or may be provided on a single main circuit board located inside the upper housing 16.

The calculated flow rate through the regulator 10 may be quickly and easily calibrated using a separate flow meter 58. The flow meter 58, which may be a turbine or other type of meter, is temporarily inserted into the downstream pipeline to measure actual fluid flow. The flow meter 58 provides feedback to an auxiliary communication device 55 (RTU, PC, etc.) or directly to the main circuit board. The feedback may be used to generate an error function based on observed flow conditions which is then incorporated into the flow calculations performed by the regulator 10, thereby to provide more accurate flow data.

Figure 3:
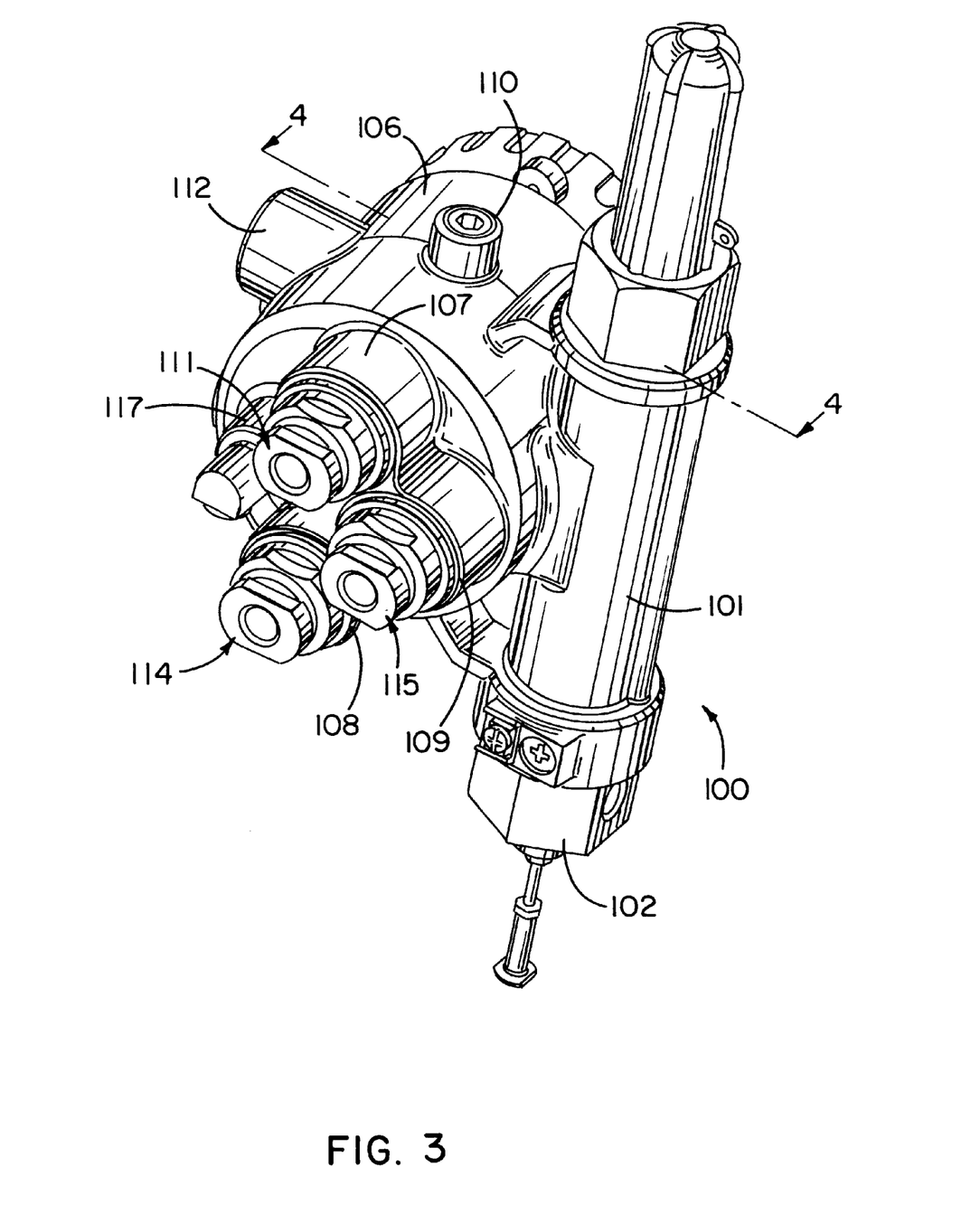
FIG. 3 is a perspective view of the regulator flow measurement apparatus.
Figure 4:
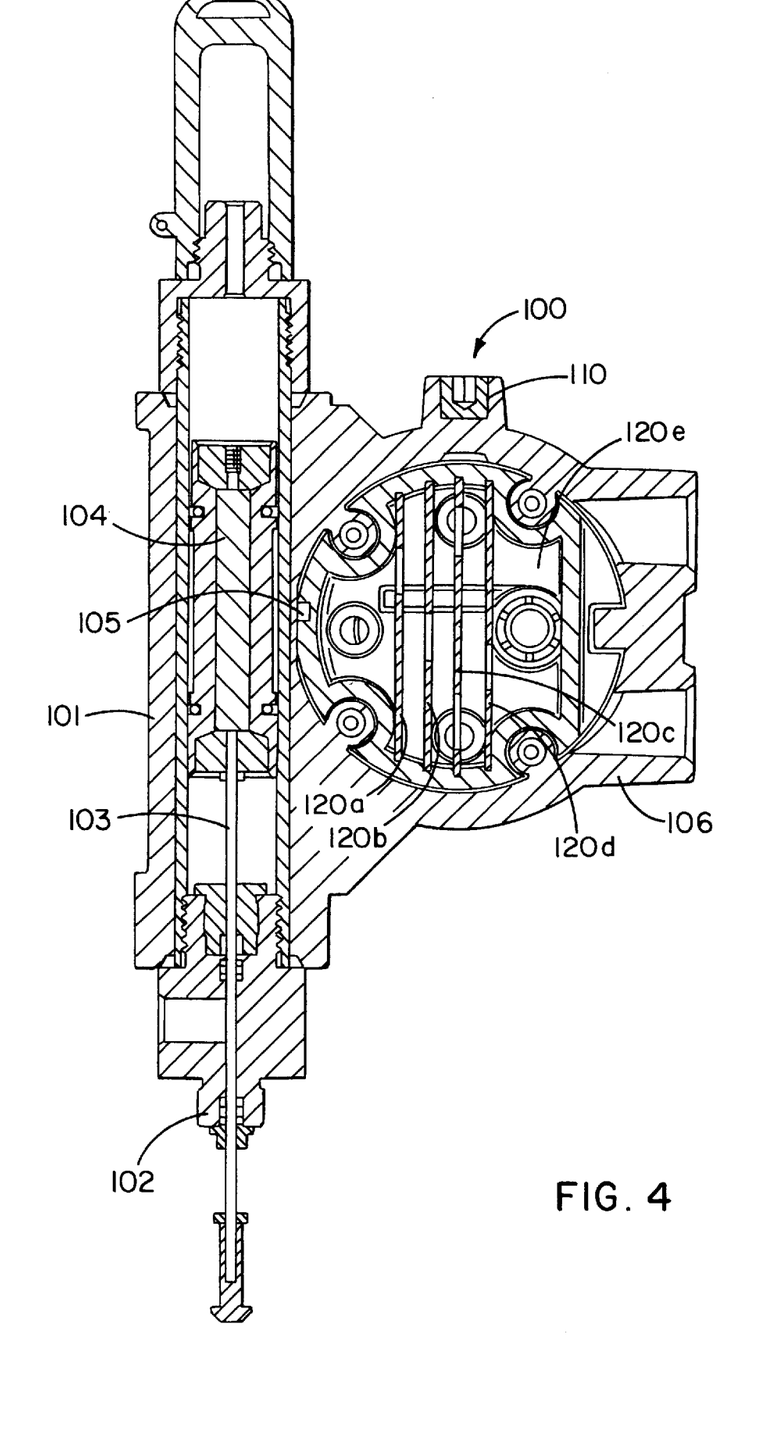
FIG. 4 is a side elevation view, in cross-section, of regulator flow measurement apparatus in accordance with the teachings of the present invention.

A currently preferred embodiment of regulator flow measurement and diagnostic apparatus is illustrated in FIG. 3, generally designated by reference numeral 100. As shown in FIG. 3, the apparatus 100 includes a cylindrical body 101 having a first end 102 adapted for connection to a regulator (not shown). As with the previous embodiments, the regulator is disposed in a fluid flow passage having an upstream section and a downstream section. The cylindrical body 101 encloses a travel indicator 103 (FIG. 4) which is connected to a diaphragm (not shown) in the regulator. According to the illustrated embodiment, a Hall effect sensor is used to detect the position of the travel indicator 103. A portion 104 of the travel indicator 103 is formed of magnetic material having pole pieces. A hall element 105 (FIG. 4) is positioned to detect the magnetic material portion 104 and generate a position signal according to the position of the travel indicator 103.

A housing 106 is attached to the cylindrical body 102 and has a first pressure port 107, a second pressure port 108, an auxiliary pressure port 109, and an auxiliary pressure port 110 (FIG. 3). A first pressure sensor assembly 111 is inserted inside the first pressure port 107, and a tube (not shown) connects the assembly 111 to the upstream section of the flow passage. A second pressure sensor assembly 114 is inserted into the second pressure port 108, and a tube (not shown) connects the second assembly 114 to the downstream section of the flow passage. A third pressure sensor assembly 115 may be inserted into the auxiliary pressure port 109 for measuring at a third pressure point. The third pressure sensor 115 may be used to measure pressure at a variety of locations, including in the flow passage or in the regulator to infer plug travel, as described in greater detail above with regard to the previous embodiment. In a preferred embodiment, a fourth pressure port 117 is provided for measuring atmospheric pressure. The auxiliary port 110 is provided for receiving discrete or analog input from another device, such as the temperature transmitter 48 illustrated in FIG. 1. In addition, an I/O port 112 is provided for connection to an outside device, as described in greater detail below.

Figure 5:
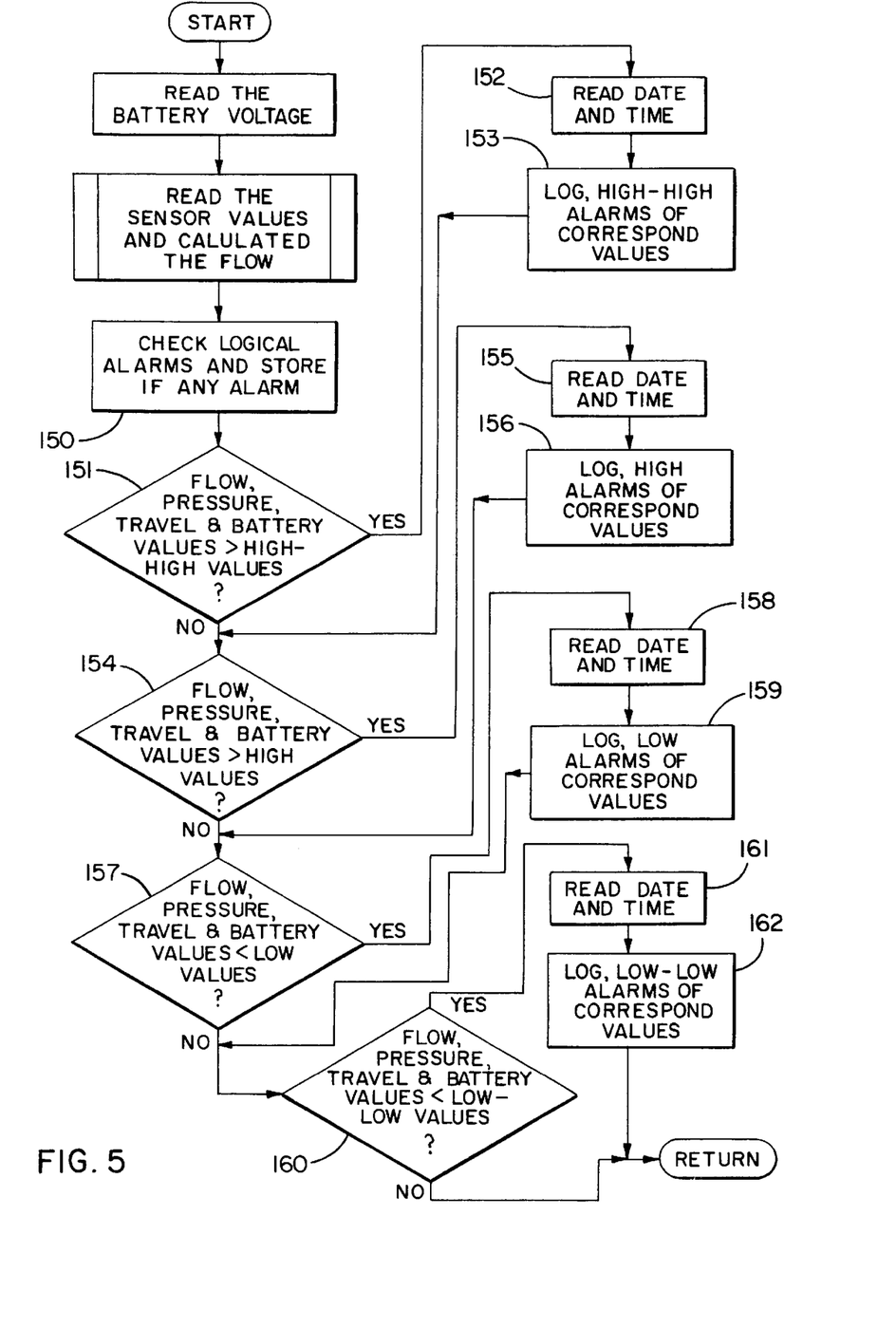
FIG. 5 is a flow chart schematically illustrating a user-specified limit portion of an alarm routine.

A plurality of circuit boards 120*a–e* are disposed inside the housing 105 for controlling various operations of the apparatus 100 (FIG. 5). In the illustrated embodiment, a first (or main) circuit board 120*a* may include an interface for the first, second, third pressure sensors, and atmospheric pressure sensors, and a connection for the hall effect sensor 105. A second (or communication) circuit board 120*b* provides an interface for communication with outside devices. The second circuit board 120*b* may include connection for wired transmission, such as a modem card, an RF232 communication driver, and a CDPD modem. In addition or alternatively, a transceiver may be provided for wireless communication. A third (or main) circuit board 120*c* preferably includes a processor, a memory, a real-time clock, and communication drivers for two communication channels. The processor may include, among other things, one or more of the algorithms noted above for calculating flow rate, while the memory may store selected parameters, such as the high and low pressures for each day. An optional fourth circuit board 120*d* provides an interface for the auxiliary communication device 55. A fifth (or termination) board 120*e* is also provided having a power supply regulator, field termination (for connection to I/O devices), a back-up power supply, and connections into which the other boards 120*a–d* may plug into. While five circuit boards 120*a–e* are shown in the illustrated embodiment, it will be appreciated that a single circuit board, less than five circuit boards, or more than five circuit boards may be used without departing from the scope of the invention.

It will be appreciated, therefore, that communication between the apparatus 100 and an outside device may be by RF modem, ethernet or other known communication like. The processor allows the outside devices to enter information such as desired pressure set points and alarm conditions into the apparatus 100, and retrieve data stored in the memory. The data retrieved may include the alarm log and stored operational parameters. For instance, the retrieved information may include a history of upstream and downstream pressures stored periodically in memory, so that the apparatus 100 provides the function of a pressure recorder.

In accordance with certain aspects of the present invention, the processor includes a routine for generating alarm signals. A first portion of the routine compares measured parameters (i.e., the upstream pressure, downstream pressure, and travel position) to certain user-specified limits, as schematically illustrated in FIG. 5. In addition, one or more logic sub-routines may be run which compares at least two of the measured parameters and generates an alarm signal based on a specific logical operation, examples of which are schematically shown in FIGS. 6 and 7A–7D.

Turning first to the level alarms, a check is initiated 150 to determine whether any level limits have been entered by the user. The pressure, travel, flow, and battery values are first compared to user entered high-high limits 151. If any of the values exceeds the high-high limits, the date and time are read 152 and a corresponding high-high alarm is logged 153. Next the measured values are compared to user entered high limits 154. If any of the values exceeds the high limits, the date and time are read 155 and a corresponding high alarm is logged 156. The values are then compared to user entered low limits 157. If any of the values is lower than a user entered low limit, the date and time are read 158 and a corresponding low alarm is logged 159. Finally, the values are compared to user entered low-low limits 160. If any of the values is lower than a low-low limit, the date and time are read 161 and a corresponding low-low alarm is logged 162.

Additional limit alarms may be set based on the calculated flow rate F. For example, a user may enter limits for instantaneous and accumulated flow. When the calculated flow rate F exceeds either of these limits, an alarm is triggered. A further alarm may be provided based on stem travel. The user may enter a limit for accumulated stem travel distance and trigger a maintenance alarm when accumulated stem travel exceeds the limit.

Figures 6, 7A:
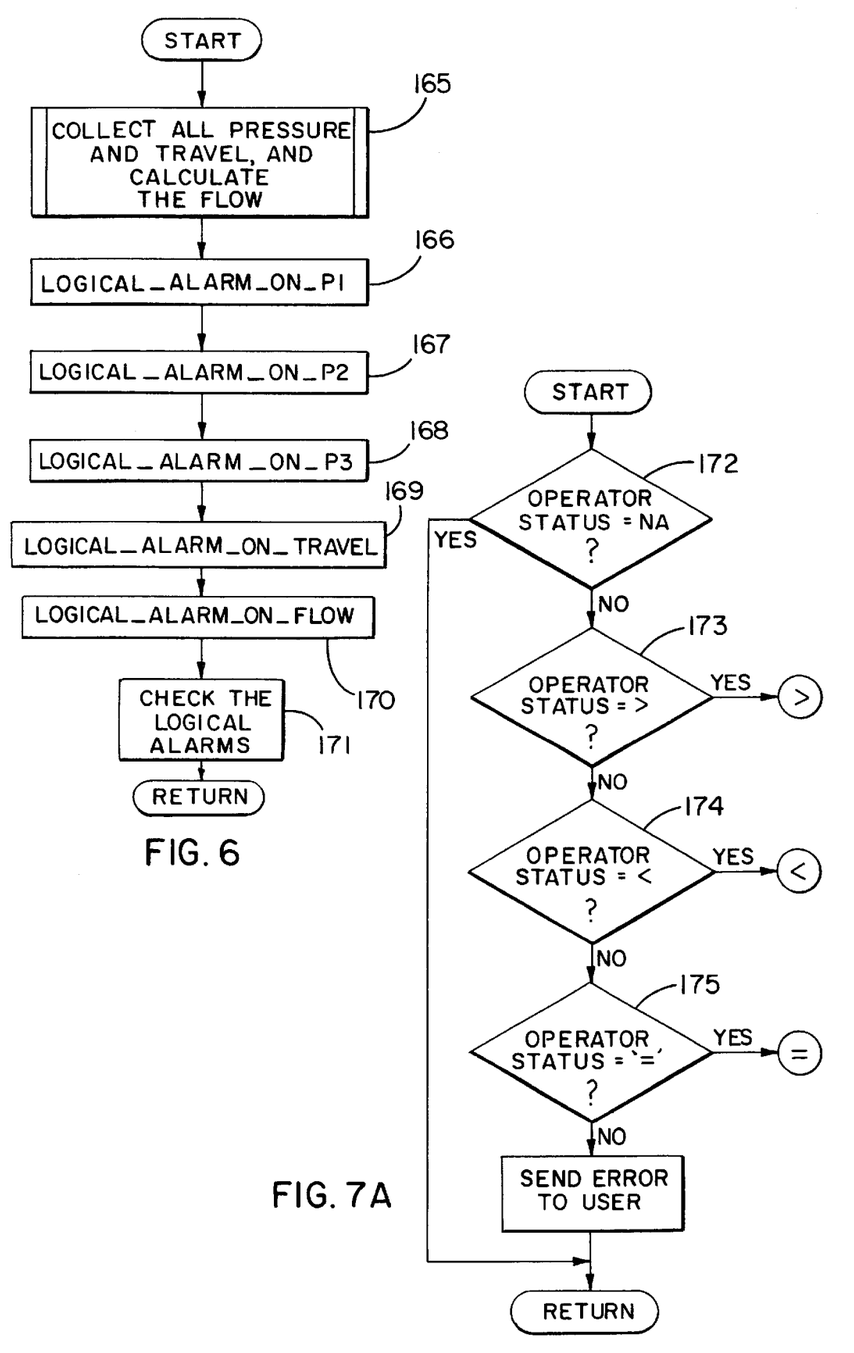
FIG. 6 is a flow chart schematically illustrating a logic alarm sub-routine.
FIGS. 7A–7E are flow charts schematically illustrating specific portions of the logic alarm sub-routine.

After checking the user-entered limit alarms, one or more logic sub-routines may be run to determine if any logical alarm conditions exist. In the preferred embodiment, each of the logic sub-routines is combined into a single, integrated logic sub-routine as generally illustrated in FIG. 6. As shown in FIG. 6, the sub-routine begins by collecting all the pressure and travel data, in calculating the flow 165 through the pressure regulator. Each of the measured parameters is then compared to both the other measured parameters and any user-specified set points. The logical alarms are monitored for upstream pressure 166, downstream pressure 167, auxiliary pressures 168, stem travel 169, and flow rate 170. Additional logical alarms may also be provided for feedback from the third pressure sensor assembly and auxiliary device connected to the P/O connection 112. After obtaining the relative values of each of the parameters, the logical alarms are then checked, as described in greater detail below.

A preferred sequence of operations for determining logical alarms based on upstream pressure (step 166) are schematically shown in FIG. 7A. First, the sub-routine checks for an entered value relating to upstream pressure 172. If a value is entered relating to upstream pressure, the sub-routine determines whether the measured upstream pressure must be greater than 173, less than 174, or equal to 175 the user-entered value. For each relative comparison (i.e., steps 173, 174 and 175), a series of sub-steps are performed as illustrated in FIGS. 7B–7D.

Figure 7B:
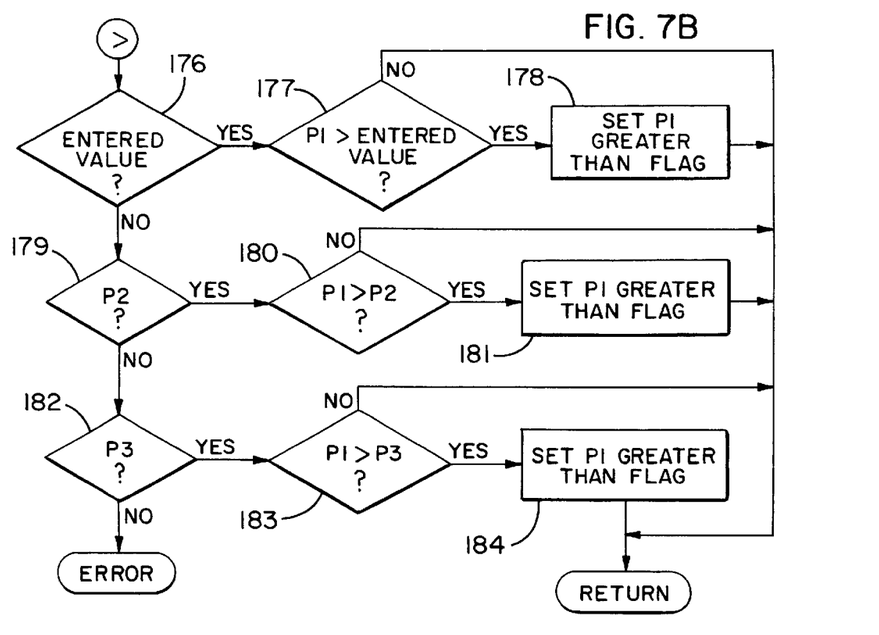

If an alarm requires the upstream pressure to be greater than a certain value, the sub-routine first checks for a specific upstream pressure value entered by the user 176 (FIG. 7B). If the user has entered a value for upstream pressure, the measured upstream pressure is compared to that entered value 177. If the measured value is greater than the entered value, the upstream pressure greater than flag is set 178. If no specific user-entered value is used, the sub-routine checks to see if downstream pressure is to be compared to the upstream pressure 179. If so, the sub-routine determines if the upstream pressure is greater than the downstream pressure 180. If so, the upstream pressure greater than downstream pressure flag is set 181. If downstream pressure is not used as a logical alarm, the sub-routine next checks for a logical alarm value based on auxiliary pressure 182. If auxiliary pressure is used as a logical alarm, the sub-routine checks whether upstream pressure is greater than the downstream pressure 183. If so, the upstream pressure greater than auxiliary pressure flag is set 184.

Figure 7C:
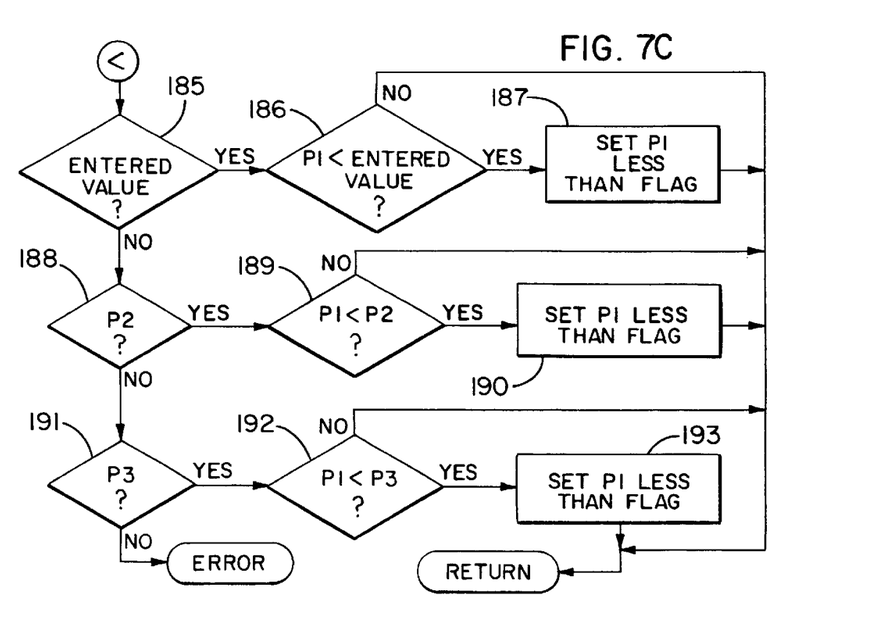
Figure 7D:
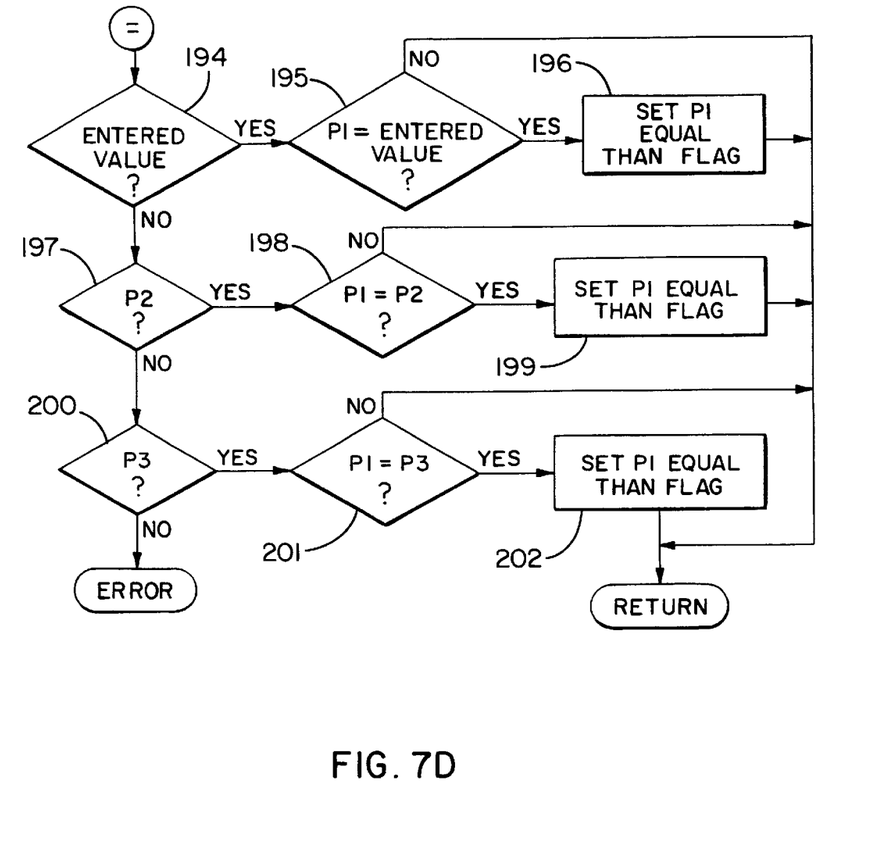

As illustrated in FIGS. 7C and 7D, the sub-routine performs similar steps to determine if upstream pressure is less than or equal to a logical alarm value 185–202. Furthermore, operations identical to those shown in FIGS. 7B–7D are performed for the downstream and auxiliary pressures to determine whether they are greater than, less than, or equal to specified logic alarm values. Since these operations are identical, separate flow charts illustrating these steps are not provided.

Figure 7E:
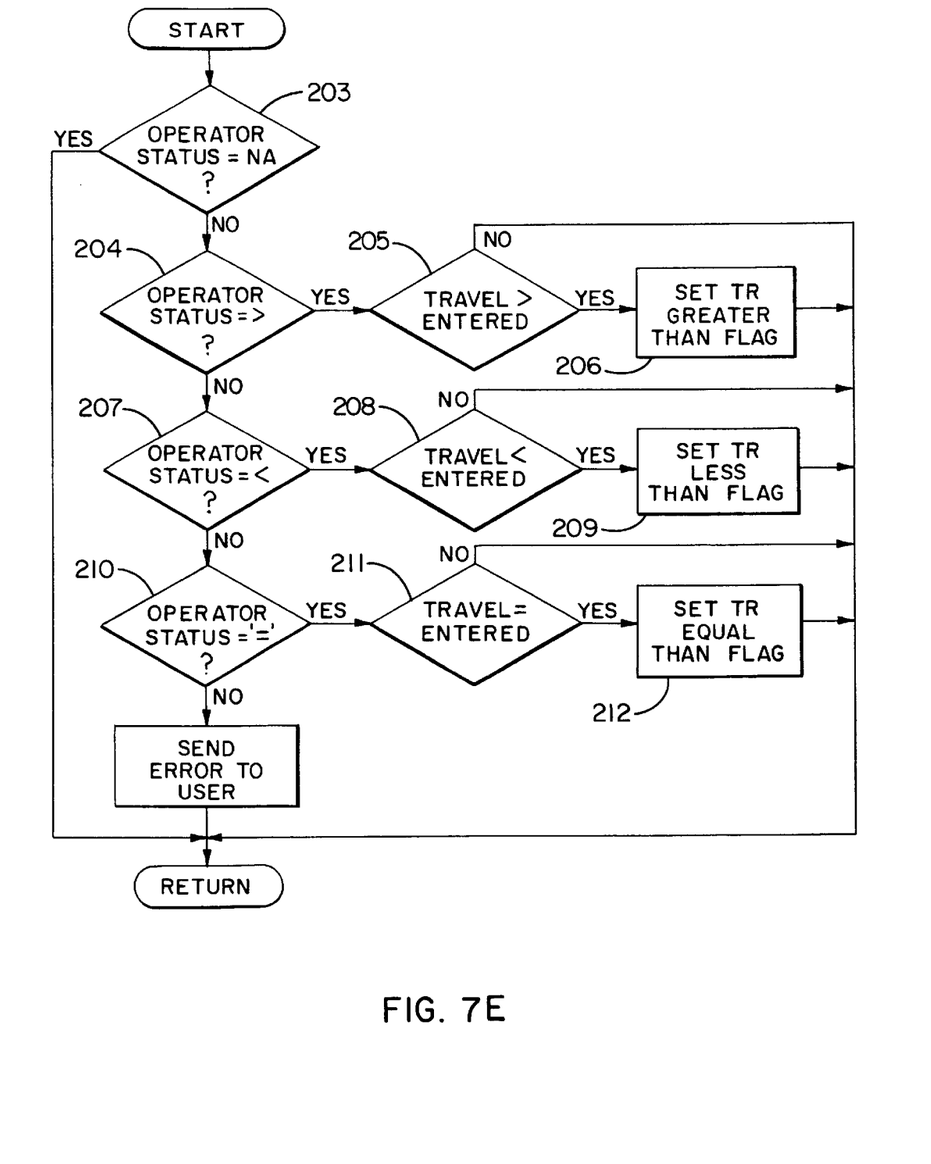

Turning to logic alarms based on travel 169 (FIG. 7A), a logic sequence flow chart is illustrated at FIG. 7E. Accordingly, the sub-routine first checks whether a travel position logic value has not been entered 203. If a traveled position logic value has been entered, the sub-routine determines whether the measured value must be greater than the logic value 204. If the logic operator is a greater than limit, the sub-routine determines whether the measured traveled position is greater than the entered value 205. If so, the travel greater than flag is set 206. If no "greater than" limit is used for travel, the sub-routine then checks for a "less than" limit 207. If a "less than" limit is detected, the sub-routine determines if the measured travel is less than the entered value 208. If so, the travel less than flag is set 209. If a "less than" value is not used, the sub-routine checks for an "equal to" operator limit 210. If an "equal to" limit is used, the sub-routine determines whether the measured travel equals the entered value 211. If so, the travel equal to flag is set 212. A similar sequence of steps may be used to determine if the calculated flow rate is greater than, less than, or equal to a logic flow alarm value, as called for at step 170 of FIG. 6.

Based on the logic flags which may be set, certain logic alarms may be triggered based on a comparison of two of the measured parameters. For example, a shut off problem alarm may be set to trigger when travel position equals zero and downstream pressure is increasing (present downstream pressure is greater than immediately preceding measured downstream pressure). When the appropriate operational conditions exist to set the corresponding logic flags, the shut off problem alarm is triggered, which may indicate that fluid is leaking through the pressure regulator possibly due to damage to the throttling element. Another logic alarm may be generated when the travel value is greater than zero and the downstream pressure signal is decreasing, which may indicate a broken stem. Yet another logic alarm may be generated when the travel value is greater than zero and the upstream pressure signal is increasing, which may also indicate a broken stem or other problem with the regulator. A further logic alarm may be triggered when the travel signal is greater than zero and the downstream pressure signal is greater than a user entered downstream pressure limit, which may indicate a problem with the pilot which controls the regulator. Other logic alarms may be entered which take into account the various measured and calculated values, so that other potential problems with the regulator may be immediately indicated.

The memory associated with the processor preferably includes an alarm log which tracks the date, time, and type of alarm. The alarm log is accessible by an outside communication device to allow an alarm history to be retrieved. Furthermore, the processor preferably includes a report by exception (RBX) circuit which automatically communicates any alarm conditions to a remotely located host computer. Accordingly, potential problems in the pipeline are quickly reported, and the particular component or damaged area is identified.

While a combined regulator flow measurement and diagnostic apparatus has been illustrated and described, it will be appreciated that a separate regulator flow measurement apparatus or a separate regulator diagnostic apparatus may be provided in accordance with the present invention.

The foregoing detailed description has been given for clearness of understanding only, and no unnecessary limitations should be understood therefrom, as modifications will be obvious to those skilled in the art.

What is claimed is:

1. A pressure regulator comprising:
    a body defining a fluid flow passage;
    an actuator housing attached to the body and having an actuator disposed therein, the actuator being in fluid communication with the fluid flow passage;
    a throttling element moveable in the flow passage and attached to the actuator;
    a first pressure sensor in fluid communication upstream of the throttling element for measuring an upstream pressure $P_1$;
    a second pressure sensor in fluid communication downstream of the throttling element for measuring a downstream pressure $P_2$;
    a travel indicator for determining a throttling element position Y; and
    a processor associated with the first pressure sensor, second pressure sensor, and travel sensor, the processor having a stored program for determining a flow rate F based on the upstream pressure $P_1$, the downstream pressure $P_2$, and the throttling element position Y.

2. The apparatus of claim 1, further comprising a temperature sensor for measuring a temperature T of the fluid, wherein the stored program determines flow rate F in accordance with:

$$F = \sqrt{\frac{K_1}{G*T}} * K_2 * Y * P_1$$

where
    $K_1$ is a temperature constant,
    G is a specific gravity of the fluid, and
    $K_2$ is a throttling element position constant.

3. The apparatus of claim 2, in which the fluid flow is sub-critical, and the flow rate algorithm is multiplied by a further function $$\sin K_3 \sqrt{\frac{P_1 - P_2}{P_1}}$$

wherein $K_3$ is a trim shape constant.

4. The apparatus of claim 2, in which the throttling element comprises a flexible member, and in which the constant $K_2$ is a function of $P_1-P_2$.

5. The apparatus of claim 2, in which the throttling element comprises a non-linear trim valve member, and in which the constant $K_2$ is a function of throttling element position Y.

6. The apparatus of claim 2, in which the throttling element comprises a non-linear trim valve member, and in which the constant $K_2$ is a function of upstream pressure $P_1$, downstream pressure $P_2$, and throttling element position Y.

7. The apparatus of claim 2, further comprising a memory structure operably coupled to the processor for storing digital data concerning operation of the pressure regulator, and a communications circuit operably coupled to the processor for communicating at least some of the stored digital data to an outside communication device.

8. The apparatus of claim 7, in which the processor includes a logic sub-routine for comparing stored digital data to current digital data to obtain diagnostic data corresponding to the operation of the pressure regulator.

9. The apparatus of claim 8, in which the processor includes a logic sub-routine for comparing at least two of the upstream pressure $P_1$, downstream pressure $P_2$, and stem position Y and generates an alarm signal in accordance with a logic sub-routine.

10. The apparatus of claim 9, in which the logic sub-routine generates an alarm when the stem position Y equals zero and the downstream pressure $P_2$ is increasing.

11. The apparatus of claim 9, in which the logic sub-routine generates an alarm when the stem position Y is greater than zero and the downstream pressure $P_2$ is decreasing.

12. The apparatus of claim 9, in which the logic sub-routine generates an alarm when the stem position Y is greater than zero and the upstream pressure $P_1$ is increasing.

13. The apparatus of claim 9, in which the logic sub-routine generates an alarm when the stem position Y is greater than zero and the downstream pressure $P_2$ is greater than a user entered downstream pressure limit.

14. The apparatus of claim 9, in which the logic sub-routine generates an alarm when the flow rate F is greater than a user entered flow rate limit.

15. The apparatus of claim 1, in which the travel sensor comprises a hall effect sensor.

16. The apparatus of claim 1, in which the pressure regulator further comprises a stem attached to the throttling element, and in which the stored program infers throttling element position Y by measuring a position of the stem.

17. The apparatus of claim 1, in which the fluid comprises a liquid, and in which the stored program determines the liquid flow rate F in accordance with:

$$F = \sqrt{\frac{K_1}{G*T}} *K_2 *Y * \sqrt{P_1 - P_2}$$

where
 $K_1$ is a temperature constant,
 G is a specific gravity of the liquid,
 T is a temperature of the liquid, and
 $K_2$ is a throttling element position constant.

18. The apparatus of claim 17, in which the throttling element comprises a non-linear trim valve member, and in which the throttling element position constant $K_2$ is a function of throttling element position Y.

19. A method for determining fluid flow through a pressure regulator, the method comprising the steps of:
 providing a body defining a fluid flow passage;
 providing an actuator housing attached to the body and having an actuator disposed therein, the actuator being in fluid communication with the fluid flow passage;
 providing a throttling element moveable in the flow passage and attached to the actuator;
 generating an upstream pressure value $P_1$ by measuring fluid pressure upstream of the throttling element;
 generating a downstream pressure value $P_2$ by measuring fluid pressure downstream of the throttling element;
 generating a travel value Y by determining a position of the throttling element; and calculating a fluid flow value F based on the upstream pressure value $P_1$, downstream pressure value $P_2$, and travel value Y.

20. The method of claim 19, further comprising the step of generating an absolute temperature value T by measuring the temperature of the fluid, wherein the fluid flow value F is calculated in accordance with:

$$F = \sqrt{\frac{K_1}{G*T}} *K_2 *Y *P_1, \text{ where}$$

$K_1$ is an absolute temperature constant,
 G is a specific gravity of the fluid, and
 $K_2$ is a stem position constant.

21. The apparatus of claim 20, in which the fluid flow is sub-critical, and the flow rate algorithm is multiplied by a further function $$\sin K_3 \sqrt{\frac{P_1 - P_2}{P_1}}$$

wherein $K_3$ is a trim shape constant.

22. The method of claim 20, in which the pressure regulator is an elastomeric style regulator, and in which the constant $K_2$ is a function of $P_1-P_2$.

23. The method of claim 20, in which the throttling element comprises a non-linear trim valve member, and in which the constant $K_2$ is a function of throttling element position Y.

24. The method of claim 20, in which the throttling element comprises a non-linear trim valve member, and in which the constant $K_2$ is a function of upstream pressure $P_1$, downstream pressure $P_2$, and throttling element position Y.

25. The method of claim 20, in which the pressure regulator comprises a flexible diaphragm connected to the throttling element, and in which the apparatus includes a third pressure sensor for measuring a gauge loading pressure $P_L$ on the diaphragm, and the stored program calculates flow rate F by substituting the gauge loading pressure $P_L$ and a loading pressure constant $K_4$ for the throttling element position Y and throttling element position constant $K_2$, respectively.

26. The method of claim 20, in which the throttling element comprises a flexible member, and in which the apparatus includes a third pressure sensor for measuring a gauge loading pressure $P_L$ on the flexible member, and the stored program calculates flow rate F by substituting the gauge loading pressure $P_L$ and a loading pressure constant $K_4$ for the throttling element position Y and throttling element position constant $K_2$, respectively.

27. The method of claim 26, in which the loading pressure constant $K_4$ is a function of upstream pressure $P_1$ minus downstream pressure $P_2$.

28. The method of claim 20, in which the throttling element comprises a non-linear trim valve member, and in which the apparatus includes a third pressure sensor for measuring a gauge loading pressure $P_L$ on the non-linear trim valve member, and the stored program calculates flow rate F by substituting the gauge loading pressure $P_L$ and a loading pressure constant $K_4$ for the throttling element position Y and throttling element position constant $K_2$, respectively.

29. The method of claim 28, in which the loading pressure constant $K_4$ is a function of gauge loading pressure $P_L$.

30. A pressure regulator comprising:
 a body defining a fluid flow passage;
 a throttling element moveable in the fluid flow passage and directly responsive to a pressure of fluid in the fluid flow passage;

a first pressure sensor in fluid communication upstream of the throttling element for measuring an absolute upstream pressure $P_1$;

a second pressure sensor in fluid communication downstream of the throttling element for measuring an absolute downstream pressure $P_2$;

a third pressure sensor for measuring a loading pressure $P_L$ on the throttling element; and a processor associated with the first pressure sensor, second pressure sensor, and third pressure sensor, the processor having a stored program for determining a flow rate F based on the upstream pressure $P_1$, downstream pressure $P_2$, and loading pressure $P_L$.

31. The apparatus of claim 30, further comprising a temperature sensor for measuring a temperature T of the fluid, wherein the stored program determines flow rate F in accordance with $$F = \sqrt{\frac{K_1}{G*T}} * K_4 * P_L * P_1 * \sin\sqrt{\frac{P_1 - P_2}{P_1}}$$

where $K_1$ is an absolute temperature constant,

G is a specific gravity of the fluid,

T is an absolute temperature of the fluid, and $K_4$ is a loading pressure constant.

32. The apparatus of claim 31, in which the loading pressure constant $K_4$ is a function of upstream pressure $P_1$ minus downstream pressure $P_2$.

33. The apparatus of claim 31, in which the loading pressure constant $K_4$ is a function of gauge loading pressure $P_L$.

34. The apparatus of claim 30, in which the throttling element comprises a flexible member, and in which the third pressure sensor measures the loading pressure $P_L$ on the flexible member.

35. The apparatus of claim 30, in which the throttling element comprises a non-linear trim valve member, and in which the third pressure sensor measures the loading pressure $P_L$ on the non-linear trim valve member.

36. A pressure regulator comprising:

a body defining a fluid flow passage;

an actuator housing attached to the body and having an actuator disposed therein, the actuator being in fluid communication with the fluid flow passage;

a throttling element moveable in the flow passage and attached to the actuator;

a first pressure sensor in fluid communication upstream of the throttling element for measuring an absolute upstream pressure $P_1$;

a second pressure sensor in fluid communication downstream of the throttling element for measuring an absolute downstream pressure $P_2$;

a third pressure sensor for measuring a loading pressure $P_L$ on the actuator; and a processor associated with the first pressure sensor, second pressure sensor, and third pressure sensor, the processor having a stored program for determining a flow rate F based on the upstream pressure $P_1$, downstream pressure $P_2$, and loading pressure $P_L$.

37. The apparatus of claim 36, further comprising a temperature sensor for measuring a temperature T of the fluid, wherein the stored program determines flow rate F in accordance with $$F = \sqrt{\frac{K}{G*T}} * K_4 * P_L * P_1 * \sin\sqrt{\frac{P_1 - P_2}{P - 1}}$$

where $K_1$ is an absolute temperature constant,

G is a specific gravity of the fluid,

T is an absolute temperature of the fluid, and $K_4$ is a loading pressure constant.

38. The apparatus of claim 36, in which the pressure regulator actuator comprises a flexible diaphragm, and in which the third pressure sensor measures the loading pressure $P_L$ on the diaphragm.

* * * * *

UNITED STATES PATENT AND TRADEMARK OFFICE
CERTIFICATE OF CORRECTION

PATENT NO.    : 6,539,315 B1
DATED         : March 25, 2003
INVENTOR(S)   : Paul R. Adams et al.

It is certified that error appears in the above-identified patent and that said Letters Patent is hereby corrected as shown below:

<u>Column 14,</u>
Line 30, please delete "P-1" and insert -- $P_1$ --

Signed and Sealed this

Fifth Day of August, 2003

JAMES E. ROGAN
*Director of the United States Patent and Trademark Office*